United States Patent
Kumagai et al.

(10) Patent No.: US 12,327,059 B1
(45) Date of Patent: Jun. 10, 2025

(54) INFORMATION DISPLAY SYSTEM

(71) Applicant: Panasonic Intellectual Property Management Co., Ltd., Osaka (JP)

(72) Inventors: Shigehiro Kumagai, Osaka (JP); Yoshiyuki Furuya, Osaka (JP); Keisuke Masatoki, Nara (JP); Kenji Seto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/426,670

(22) Filed: Jan. 30, 2024

(51) Int. Cl.
*G06F 3/14* (2006.01)
*H04L 69/18* (2022.01)

(52) U.S. Cl.
CPC ............ *G06F 3/1423* (2013.01); *H04L 69/18* (2013.01)

(58) Field of Classification Search
CPC .............. H04L 67/12; B64D 11/00155; B64D 11/0015
See application file for complete search history.

(56) References Cited

U.S. PATENT DOCUMENTS

| | | | |
|---|---|---|---|
| 9,571,619 B2 | 2/2017 | Akama et al. | |
| 2003/0156097 A1 | 8/2003 | Kakihara et al. | |
| 2006/0143662 A1* | 6/2006 | Easterling | H04N 5/50 |
| | | | 725/77 |
| 2006/0174285 A1 | 8/2006 | Brady, Jr. et al. | |
| 2008/0189748 A1* | 8/2008 | Bleacher | H04N 19/44 |
| | | | 375/E7.093 |
| 2014/0237517 A1 | 8/2014 | Tranchina | |
| 2016/0212253 A1 | 7/2016 | Akama et al. | |
| 2019/0090008 A1 | 3/2019 | Morales et al. | |
| 2021/0219002 A1* | 7/2021 | Barnes | B64D 11/00155 |
| 2023/0156149 A1* | 5/2023 | Balcioglu | H04N 7/108 |
| | | | 375/366 |

FOREIGN PATENT DOCUMENTS

| | | |
|---|---|---|
| JP | 2003-244343 | 8/2003 |
| WO | 2015/033761 | 3/2015 |

OTHER PUBLICATIONS

Extended European Search Report issued May 31, 2024 in corresponding European Patent Application No. 24151935.4.

* cited by examiner

*Primary Examiner* — Yuzhen Shen
(74) *Attorney, Agent, or Firm* — Wenderoth, Lind & Ponack L.L.P.

(57) ABSTRACT

An information display system 10 comprises a display device 21, a seat box 30, a LAN cable 41, and a GMSL 42. The display device 21 has a display 21a that displays various kinds of information, and a USB connection part 21b that inputs and outputs data. The seat box 30 has a housing different from that of the display device 21, and processes video signals related to video displayed on the display 21a. The LAN cable 41 connects the display device 21 and the seat box 30, and uses IP protocol to perform communication between the display device 21 and the seat box 30. The GMSL 42 connects the display device 21 and the seat box 30, and transmits a signal from the seat box 30 to the display device 21 using a GMSL 42 that is different from that of the LAN cable 41.

10 Claims, 5 Drawing Sheets

INFORMATION DISPLAY SYSTEM

BACKGROUND

Technical Field

The present disclosure relates to an information display system that provides various kinds of entertainment information, such as movies, to passengers sitting in seats installed in an aircraft, for example.

Description of the Related Art

Entertainment systems equipped with a server having digital content communicatively linked to a communication network, a connector that is disposed near each passenger's seat and is communicatively linked to the network, and a distribution terminal have been used in recent years in moving bodies such as airplanes.

For example, Patent Literature 1 discloses an onboard entertainment system configured such that each handout terminal placed on a passenger seat is connected to a connector, and the passengers in the seats near the connector can access digital content.

CITATION LIST

Patent Literature

Patent Literature 1: US Patent Application Publication No. 2006/0174285

SUMMARY

Problem to be Solved by the Disclosure

However, the following problem is encountered with the conventional onboard entertainment system discussed above.

With the onboard entertainment system disclosed in the above publication, the monitor installed in each seat is connected to the seat box installed near the seat and to the onboard system installed at the front or rear of the cabin via Ethernet.

Accordingly, when the connection is via Ethernet, there is a risk that there will be a heavy load on the transmission and reception of uncompressed video signals used for monitor display due to video signal decoding, etc., for example, which ends up diminishing operability from the monitor installed at each seat or the operation device.

It is an object of the present disclosure to provide an information display system with which the communication load can be reduced and diminished operability can be avoided even when transmitting and receiving large amounts of data, such as a video signal.

Means for Solving Problem

The information display system disclosed herein is an information display system that displays various kinds of information on a display device installed inside a moving body, the information display system comprising a display device, a video processing device, a first physical line, and a second physical line. The display device has a display that displays various kinds of information, and an input/output unit that inputs and/or outputs data. The video processing device has a different housing from that of the display device and processes video signals related to the video displayed on the display. The first physical line connects the display device and the video processing device and uses a first protocol to perform communication between the display device and the video processing device. The second physical line connects the display device and the video processing device and uses a second protocol different from that of the first physical line to transmit signals from the video processing device to the display device.

Effects

With the information display system disclosed herein, the communication load can be reduced and diminished operability can be avoided even when transmitting and receiving large amounts of data, such as a video signal.

DETAILED DESCRIPTION OF THE EMBODIMENT

Embodiments will now be described in detail through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

The information display system 10 according to an embodiment of the present disclosure will now be described through reference to FIGS. 1 to 4.

(1) Information Display System 10

Figure 1:
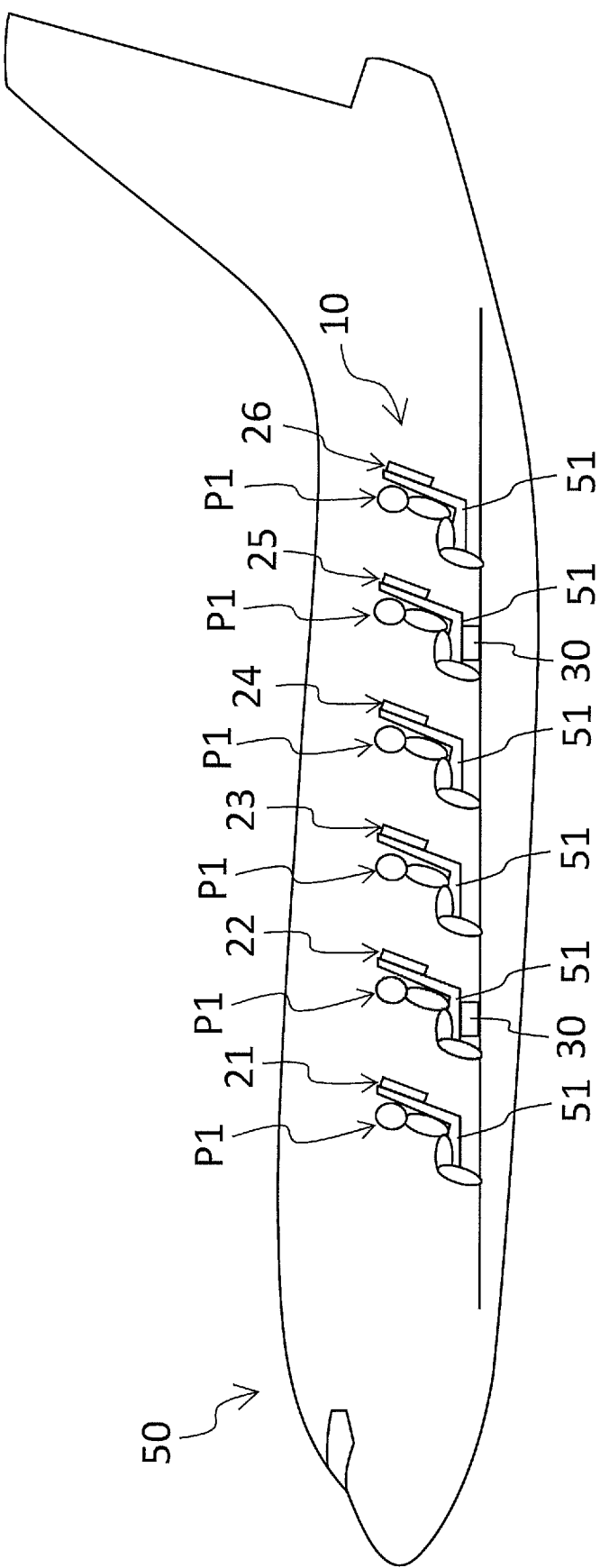
FIG. 1 is a schematic diagram showing a configuration inside an airplane equipped with the information display system according to an embodiment of the present disclosure.

The information display system 10 according to this embodiment is, for example, an aircraft entertainment system connected via a network to a server (not shown) that is installed in an aircraft (moving body) 50, as shown in FIG. 1. The information display system 10 provides video information, such as movies, animations, and games, and audio information, such as music and radio, to passengers P1 of the aircraft 50 on display devices 21 to 26 installed at seats 51.

In the following description, for the sake of convenience, the display devices 21, 22, and 23 will be described from among the plurality of display devices 21 to 26 installed in the aircraft 50, but the same applies to the display devices 24 to 26.

Figure 2:
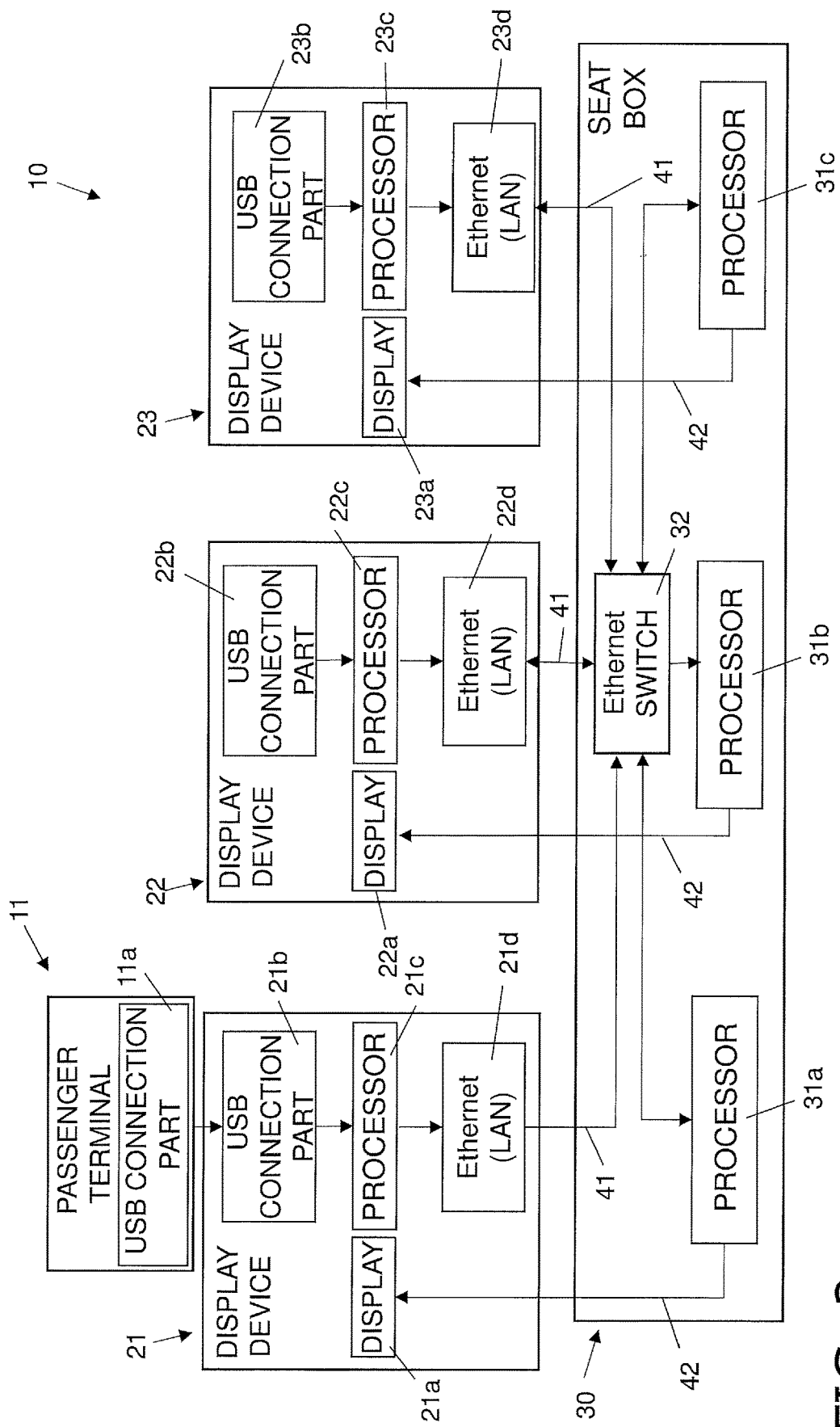
FIG. 2 is a control block diagram of the configuration of the information display system in FIG. 1.

As shown in FIG. 2, the information display system 10 comprises display devices 21, 22, and 23, a seat box (video processing device) 30 provided for each of the display devices 21, 22, and 23, and a LAN cable (first physical line) 41 and GMSL (gigabit multimedia serial link) (second physical line) 42 that connect the devices 21, 22, 23 and the seat box 30.

(2) Display Devices 21, 22, and 23

As shown in FIG. 1, the display devices 21, 22, and 23 are respectively provided on the backs of a plurality of seats 51 that are installed in the cabin of an aircraft (moving body) 50 and in which the passengers P1 are seated, and provide entertainment such as movies or music selected by the passengers P1. As shown in FIG. 2, each of the display devices 21, 22, and 23 is connected via the LAN cable 41 and the GMSL 42 to a single seat box 30.

Power is supplied from the seat box 30 to the display devices 21, 22, and 23 through power cables connected to the seat box 30, but in this embodiment, for the sake of convenience, the power cables are not depicted.

As shown in FIG. 2, the display devices 21, 22, and 23 have displays 21a, 22a, and 23a, USB connection parts (input/output units) 21b, 22b, and 23b, processors (second processors) 21c, 22c, and 23c, and Ethernets (LANs) 21d, 22d, and 23d.

The displays 21a, 22a, and 23a are, for example, LCD (liquid crystal display) or OLED (organic light emitting diode) units compatible with touch panel operation input. The displays 21a, 22a, and 23a receive video signals and the like processed by the processors 31a, 31b, and 31c on the seat box 30 side, and display movies, games, and other such entertainment.

The USB connection parts (input/output units) 21b, 22b, and 23b include connectors that can make USB (universal serial bus) connection via USB cables connected to USB connection parts 11a on the passenger terminal 11 side, such as smartphones, tablet terminals, or PCs (personal computers) owned by the passengers P1. There are no particular restrictions on the input/output units so long as they can exchange input and output with the passenger terminals 11, and may be Bluetooth, for example.

Figure 3:
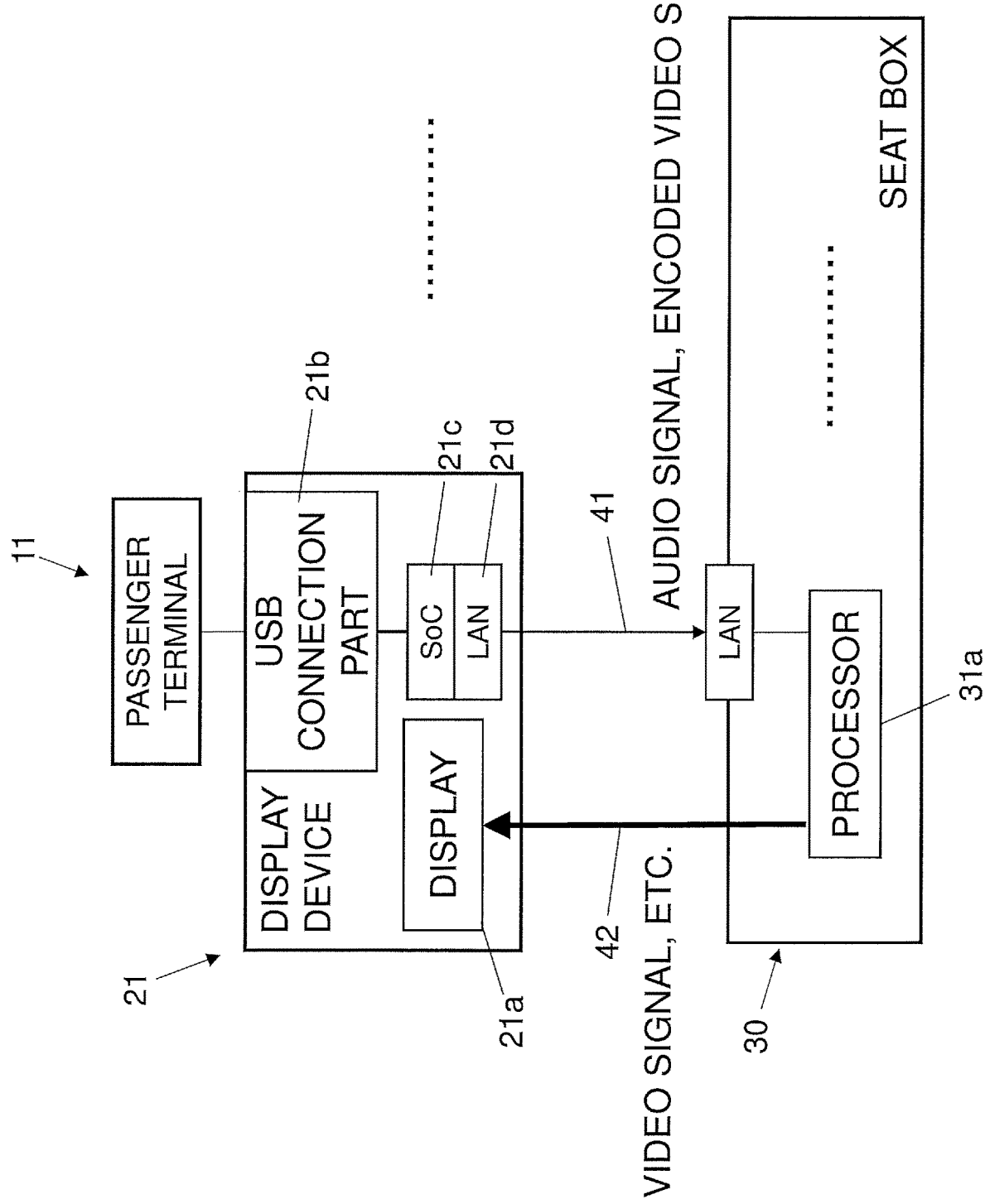
FIG. 3 is a control block diagram of the connection relationship between one of the plurality of display devices included in the information display system in FIG. 2, a passenger terminal, and a seat box.

The processors (second processors) 21c, 22c, and 23c are SoCs (systems on a chip) as shown in FIG. 3, for example, and perform processing of relatively small loads, such as audio conversion (A/D conversion, volume control).

Also, the processors 21c, 22c, and 23c convert the USB protocol signals received from the passenger terminals 11 into IP protocol signals, and transmit these signals to the seat box 30 via the LAN cables 41.

Consequently, a USB cable is used only in the portion that connects the passenger terminal 11 and the USB connection part 21b of the display device 21. Therefore, since no USB cables are used between the seat box 30 and each of the display devices 21, 22, and 23, this avoids problems (such as disconnection or deterioration of communication quality) that can arise with long USB wiring.

The Ethernets (LANs) 21d, 22d, and 23d are, for example, the LAN (local area network) shown in FIG. 3, and are connected to the seat box 30 via the LAN cables 41.

(3) Seat Box 30

The seat box (video processing device) 30 is provided in order to process video signals displayed on the display devices 21, 22, and 23, and is installed in the space under the seat 51 as a separate housing from that of the display devices 21, 22, and 23, as shown in FIG. 1, for example. As shown in FIG. 2, the seat box 30 has the processors (first processors) 31a, 31b, and 31c and an Ethernet switch 32.

Connecting the plurality of display devices 21, 22, and 23 to a single seat box 30 in this way allows the boards to which the cable connectors are connected to be consolidated on the seat box 30 side, which results in a smaller overall size of the system.

The processors (first processors) 31a, 31b, and 31c are provided to correspond respectively to the plurality of display devices 21, 22, and 23, and execute processing with a heavier load than that of the processors 21c, 22c, and 23c on the side of the display devices 21, 22, and 23. The processors 31a, 31b, and 31c receive encoded video signals, etc., from the display devices 21, 22, and 23, and perform decoding processing. The processors 31a, 31b, and 31c convert IP protocol signals into USB protocol signals, determine the display screens of the displays 21a, 22a, and 23a on the basis of signals from the passenger terminals 11, and transmit information about the display screens of the displays 21a, 22a, and 23a by using the GMSLs 42.

The processors 31a, 31b, and 31c on the seat box 30 side are connected to the corresponding display devices 21, 22, and 23, each via a GMSL 42.

Because the processors (first processors) 31a, 31b, and 31c are thus consolidated into the housing of the seat box 30 so as to correspond respectively to the plurality of display devices 21, 22, and 23, they can share a waste heat mechanism and so forth, which allows the overall size of the system to be reduced.

Here, the processing capability of the processors 31a, 31b, and 31c provided to the seat box 30 is higher than that of the processors 21c, 22c, and 23c provided to the display devices 21, 22, and 23. Thus performing signal processing of the video and the like disposed on the displays 21a, 22a, and 23a provided on the side of the display devices 21, 22, and 23 in the processors 31a, 31b, and 31c provided on the seat box 30 side reduces the processing load on the processors 21c, 22c, and 23c on the side of the display devices 21, 22, 23. Consequently, the waste heat mechanism of the display devices 21, 22, and 23 can be made smaller, so the housings of the display devices 21, 22, and 23 can also be made smaller.

The Ethernet switch 32 is a device that connects a plurality of devices based on the Ethernet communication standard, recognizes the MAC (media access control) address of the connected devices, and transmits data to required communication partners. In this system, the Ethernet switch 32 selectively switches communication between the display devices 21, 22, and 23 (Ethernets 21d, 22d, and 23d) and the processors 31a, 31b, and 31c on the seat box 30 side, as shown in FIG. 2.

(4) LAN Cable 41 and GMSL 42

The LAN cable (first physical line) 41 is a cable that transmits and receives data in compliance with the Ethernet communication standard, and transmits and receives data, such as audio signals and operation signals for operation buttons on the display devices 21, 22, and 23, as signals with a smaller volume than the data transmitted via the GMSL 42.

The GMSL (gigabit multimedia serial link) (second physical line) 42 is a communication means for performing high-speed digital data streaming in short-distance communication, and transmits video signals to be displayed on the displays 21a, 22a and 23a included in the display devices 21, 22, and 23, for example.

Consequently, because the GMSL 42 offers performance that allows high-speed one-way communication, even when transmitting a large-volume video signal, etc., from the seat box 30 to the display devices 21, 22, and 23, transmission from the seat box 30 toward the display devices 21, 22, and 23 can be performed at a higher speed than with the LAN cable 41.

Also, performing serial communication via the GMSL 42 allows the GMSL 42 to have a finer gauge, or the transmission path to be longer, than is the case with parallel communication.

Here, for example, the passenger terminal 11 signal transmitted from the passenger terminal 11 via the LAN cable 41 includes at least an encoded video signal. The passenger terminal 11 signal transmitted from the seat box 30 via the GMSL 42 includes a signal obtained by decoding the encoded video signal.

Also, the transmission speed from the seat box 30 to the display devices 21, 22, and 23 via the GMSL 42 is higher than the transmission speed from the display devices 21, 22, and 23 to the seat box 30.

Consequently, in communication via the LAN cable 41 (from the display devices 21, 22, and 23 to the seat box 30), encoded data whose volume has been compressed is transmitted, and in communication via the GMSL 42 (from the seat box 30 to the display devices 21, 22, and 23), a large volume of decoded data is transmitted at high speed.

This reduces the processing load on the processors 21c, 22c, and 23c on the side of the display devices 21, 22, and 23, which means that processors whose processing capacity is lower than that of the processors 31a, 31b, and 31c on the seat box 30 side can be used.

Mirroring Display on Display Devices 21, 22, and 23

Here, in the information display system 10 of this embodiment, so-called mirroring processing will be described, in which a display screen of a display device (first monitor) 21 is displayed on other display devices (second monitors) 22 and 23.

Figure 4:
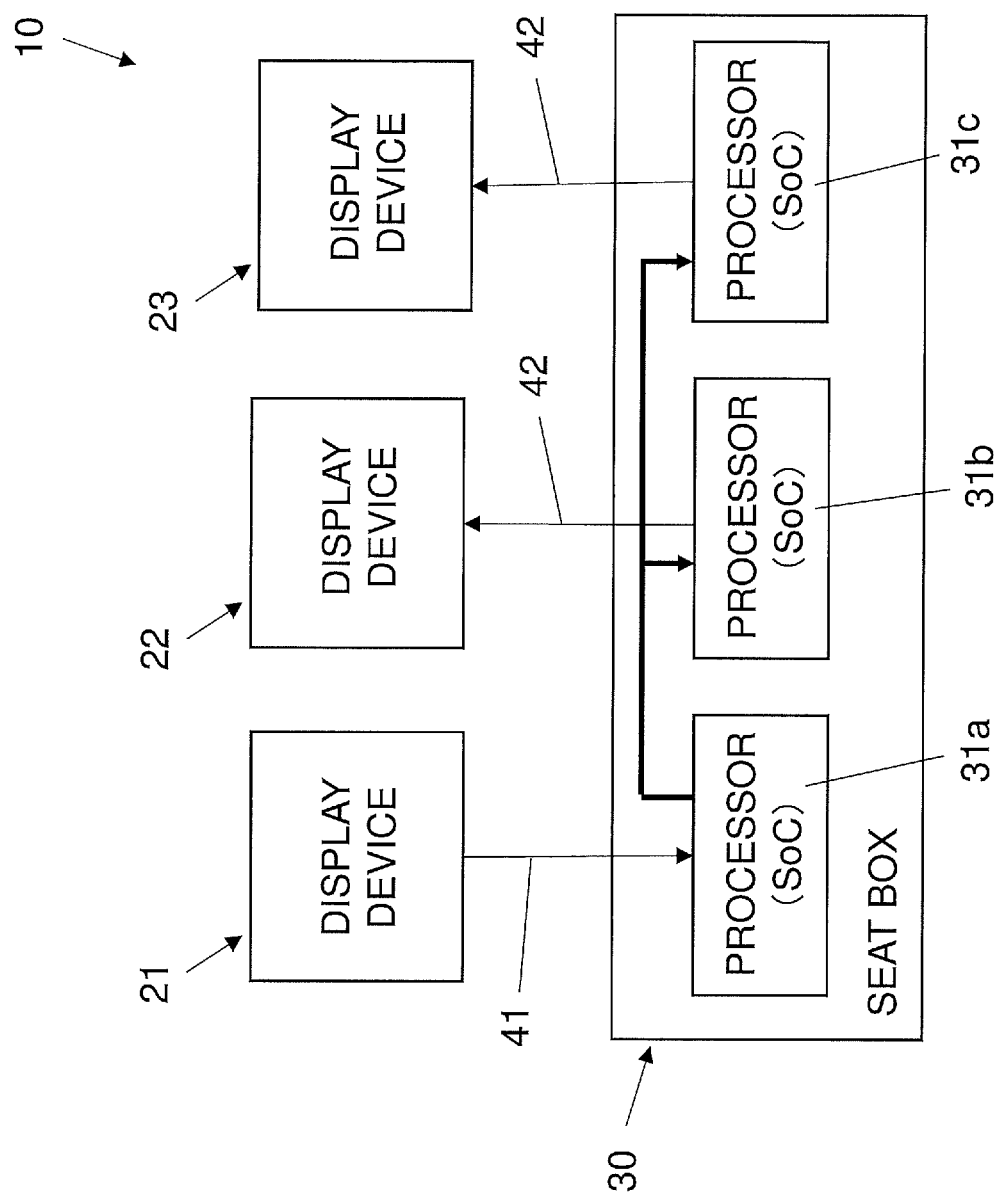
FIG. 4 is a schematic diagram of mirroring the same video from one of the plurality of display devices included in the information display system in FIG. 2 to another display device.

In FIG. 4, for the sake of convenience, the display device 21 and the processor 31a are shown as being connected by the LAN cable 41, and the display devices 22 and 23 and the processors 31b and 31c as being connected by the GMSL 42. In actual practice, however, as shown in FIG. 2, etc., the display device 21 and the processor 31a, the display device 22 and the processor 31b, and the display device 23 and the processor 31c are each connected by a LAN cable 41 and a GMSL 42.

As shown in FIG. 4, the display device 21 transmits information about the display screen of the display 21a to the processor 31a via the LAN cable 41, which is connected to the single seat box 30. At this point, in order to reduce the communication load via the LAN cable 41, the information about the display screen of the display device 21 is preferably transmitted in a state of having been encoded and compressed.

On the other hand, with the display devices 22 and 23, information is transmitted from the processor 31a in the seat box 30 to the processors 31b and 31c on the board. The processors 31b and 31c then transmit information to the display devices 22 and 23 via the GMSL 42.

Consequently, as shown in FIG. 4, when the screen displayed on the display device 21 (parent screen) is mirrored as a child screen on the display devices 22 and 23, screen information can be sent to the display devices 22 and 23 via the GMSL 42. Accordingly, for example, information about the display screen displayed on the display device 21 can be projected as a child screen on the display devices 22 and 23 without having to go through a LAN or other IP communication.

Therefore, even when mirroring the display screen of the display device 21 is mirrored by projecting it onto the plurality of display devices 22 and 23, the transmitted screen information passes through the LAN cable 41 only once. This avoids an increase in the communication load on the LAN cable 41 and a decrease in the operability of the display device 21.

Also, the information transmitted from the display device 21 is transmitted from the processor 31a corresponding to the display device 21 to the processors 31b and 31c corresponding to the other display devices 22 and 23 on the board inside the seat box 30.

As a result, it is easier to utilize a transmission path with a higher communication speed than when transmitting via a cable.

Main Features

As shown in FIG. 1, the information display system 10 according to an embodiment of the present disclosure is an information display system that displays various kinds of information on a plurality of display devices 21 installed inside an aircraft 50, and as shown in FIG. 3, comprises the display device 21, the seat box 30, the LAN cable 41, and the GMSL 42. The display device 21 has a display 21a that displays various kinds of information, and a USB connection part 21b that inputs and outputs data. The seat box 30 has a different housing from that of the display device 21, and processes video signals related to the video displayed on the display 21a. The LAN cable 41 connects the display device 21 and the seat box 30, and performs communication between the display device 21 and the seat box 30 using the IP protocol. The GMSL 42 connects the display device 21 and the seat box 30, and transmits a signal from the seat box 30 to the display device 21 using the GMSL 42, which is different from the LAN cable 41.

This prevents the concentration of processing load on the Ethernet by connecting the display device 21 and the seat box 30 via two different physical lines (LAN cable 41 and GMSL 42).

More specifically, if one of the two physical lines (the LAN cable 41) transmits and receives signals with a small volume, such as audio, and the other physical line (the GMLS 42), which can communicate at higher speeds than Ethernet, transmits signals with a large volume, such as video, the signal processing of the video images displayed on the displays 21a to 23a of the display device 21 can be processed on the seat box 30 side and transmitted to the display device 21.

As a result, even when transmitting and receiving large amounts of data, such as video signals, from the seat box 30 to the display device 21, the communication load can be reduced and a decrease in the operability of the display devices 21 to 23 can be avoided.

Also, if video signals and the like are processed at the seat box 30, which is a different housing from that of the display device 21, part of the mechanism of the display device 21 is moved to the seat box 30, which allows the display device 21 to be smaller.

Other Embodiments

An embodiment of the present disclosure was described above, the present disclosure is not limited to or by the above embodiment, and various changes can be made without departing from the gist of the disclosure.

(A)

In the above embodiment, an example was given in which the plurality of processors 31*a*, 31*b*, and 31*c* corresponding to the display devices 21, 22, and 23, respectively, were provided inside the seat box 30 as shown in FIG. 2. However, the present disclosure is not limited to this.

Figure 5:
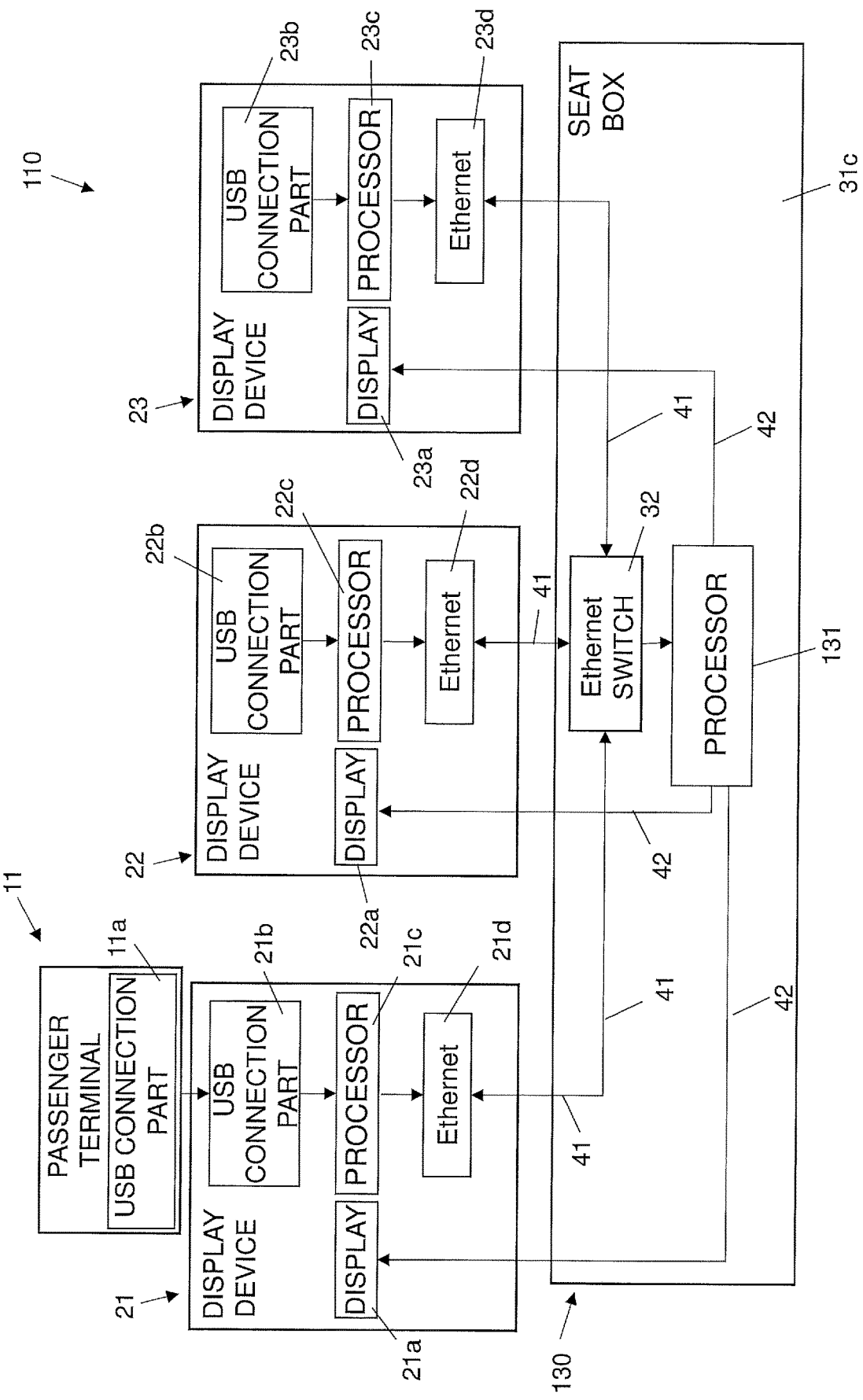
FIG. 5 is a control block diagram of the configuration of the information display system according to another embodiment of the present disclosure.

For example, as shown in FIG. 5, a seat box 130 may be configured such that a single processor (first processor) 131 is provided for the plurality of display devices 21, 22, and 23.

In this case, the processor 131 can operate virtual machines corresponding to the plurality of display devices 21, 22, and 23. Consequently, it is also possible to update the plurality of display devices 21, 22, and 23 at the same time with a single update.

Therefore, even if the specifications of the hardware (USB driver, audio I/O (input/output unit), video processor, etc.) of the display devices 21, 22, and 23 included in the information display system 110 are different, there is no need to perform an update for each model of the display device. This allows update processing to be performed more flexibly than in the past, regardless of the hardware specifications of the display device.

(B)

In the above embodiment, an example was given in which the LAN cable 41 was used as a first physical line that connected the display devices 21, 22, 23 and the seat box 30 and that performed communication between the display devices 21, 22, and 23 and the seat box 30 using a first protocol. However, the present disclosure is not limited to this.

For example, the configuration may be such that a display device and a video processing device (seat box) are connected using a physical line other than a LAN cable.

(C)

In the above embodiment, an example was given in which the GMSL 42 was used as a second physical line that connected the display devices 21, 22, and 23 to the seat box 30, and that transmitted signals from the video processing device to the display device using a second protocol different from the first physical line. However, the present disclosure is not limited to this.

For example, the configuration may be such that a display device and a video processing device (seat box) are connected using a physical line other than a GMSL.

(D)

In the above embodiment, an example was given in which a video signal was transmitted from the seat box 30 to each of the display devices 21, 22, and 23 via a GMSL (second physical line) 42. Here, the second physical line is preferably capable of bidirectional transmission and its transmission speed in one direction is preferably higher than the transmission speed in the other direction, as is the case with a GMSL 42. However, the present disclosure is not limited to this, and the second physical line may instead be HDMI or Displayport.

For example, the signal transmitted via the second physical line is not limited to being a video signal, and may instead be some other signal having a larger volume than the signal transmitted via the first physical line.

(E)

In the above embodiment, an example was given in which audio signals or the like were transmitted between each of the display devices 21, 22, and 23 and the seat box 30 via the LAN cable (first physical line) 41. However, the present disclosure is not limited to this.

For example, the signal transmitted via the first physical line is not limited to being an audio signal, and may instead be some other signal having a smaller volume than the signal transmitted via the second physical line.

(F)

In the above embodiment, an example was given in which the aircraft shown in FIG. 1 was used as the moving body in which the information display system 10 according to the present disclosure was installed. However, the present disclosure is not limited to this.

For example, the moving body in which the information display system of the present disclosure is installed may be something besides an aircraft, such as a train, bus, or ship.

INDUSTRIAL APPLICABILITY

The information display system of the present disclosure exhibits the effect that the communication load can be reduced and a decrease in operability can be avoided even when transmitting and receiving large amounts of data such as video signals, and as such can be widely applied to various kinds of system in which video or the like is displayed on a display device installed in a moving body.

What is claimed is:

1. An information display system that displays various kinds of information on a display device installed inside a moving body, the information display system comprising:
    a display device having a display configured to display various kinds of information, and an input/output unit configured to input and/or output data;
    a video processing device that has a different housing from that of the display device and processes video signals related to the video displayed on the display;
    a first physical line that connects the display device and the video processing device and is configured to use a first protocol to perform communication between the display device and the video processing device; and
    a second physical line that connects the display device and the video processing device and is configured to use a second protocol different from that of the first physical line to transmit signals from the video processing device to the display device,
    wherein the video processing device has a first processor, and the display device has a second processor,
    wherein the input/output unit includes a connector configured to allow USB (Universal Serial Bus) connection of at least a passenger terminal owned by a passenger,
    the second processor provided to the display device converts a USB protocol signal received from the passenger terminal into an IP protocol signal and uses the first physical line to transmit this signal to the video processing device, and
    the first processor provided to the video processing device:
    converts the IP protocol signal into a USB protocol signal, and
    determines a display screen of the display on the basis of a signal from the passenger terminal, and uses the second physical line to transmit information about the display screen to the display.

2. The information display system according to claim 1, wherein the second physical line transmits a video signal to be displayed on the display.

3. The information display system according to claim 1, wherein a plurality of the display devices are provided corresponding to each of a plurality of seats provided to the moving body, and the plurality of display devices are connected to a single video processing device via the first physical line and the second physical line.

4. The information display system according to claim 1, wherein a plurality of the display devices are provided corresponding to a plurality of seats provided to the moving body, the plurality of display devices are each connected by the second physical line to a single video processing device, and the display devices each include a first monitor that transmits information about the display screen over the second physical line, and a second monitor that is connected to the video processing device via the first physical line and is different from the first monitor.

5. The information display system according to claim 1, wherein the video processing device has a plurality of the first processors corresponding to the plurality of display devices, and the plurality of display devices are connected to the corresponding first processors by the second physical line.

6. The information display system according to claim 1, wherein the first processor operates virtual machines corresponding to the plurality of display devices.

7. The information display system according to claim 1, wherein a passenger terminal signal transmitted from the passenger terminal over the first physical line includes at least an encoded video signal, and the passenger terminal signal transmitted from the video processing device over the second physical line includes a signal obtained by decoding this encoded video signal.

8. The information display system according to claim 1, wherein in the second physical line, a transmission speed from the video processing device to the display device is at least higher than the transmission speed from the display device to the video processing device.

9. The information display system according to claim 1, wherein the second physical line communicates by serial communication.

10. The information display system according to claim 1, wherein a processing capacity of the first processor provided to the video processing device is higher than the processing capacity of the second processor provided to the display device.

* * * * *